United States Patent
Chen et al.

(10) Patent No.: US 11,412,531 B2
(45) Date of Patent: Aug. 9, 2022

(54) METHOD FOR TRANSMITTING UPLINK DATA AND TERMINAL DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 63 days.

(21) Appl. No.: 16/911,372

(22) Filed: Jun. 24, 2020

(65) Prior Publication Data
US 2020/0329487 A1 Oct. 15, 2020

Related U.S. Application Data

(63) Continuation of application No. PCT/CN2017/119323, filed on Dec. 28, 2017.

(51) Int. Cl.
*H04W 52/32* (2009.01)
*H04W 72/12* (2009.01)
(Continued)

(52) U.S. Cl.
CPC ....... *H04W 72/1268* (2013.01); *H04L 5/0057* (2013.01); *H04W 52/146* (2013.01);
(Continued)

(58) Field of Classification Search
CPC . H04W 52/146; H04W 52/08; H04W 52/242; H04W 52/10; H04W 52/38;
(Continued)

(56) References Cited

U.S. PATENT DOCUMENTS

2017/0164363 A1 6/2017 Zhang et al.
2019/0289513 A1* 9/2019 Jeon .................. H04W 72/0453
(Continued)

FOREIGN PATENT DOCUMENTS

| CN | 104468030 A | 3/2015 |
| CN | 107276734 A | 10/2017 |
| CN | 107371241 A | 11/2017 |

OTHER PUBLICATIONS

LG Electronics, Intel Corporation, WF on remaining issues on SRS field, 3GPP TSG RAN WG1 Meeting #91 R1-1721568, Nov. 28-Dec. 1, 2017.

(Continued)

*Primary Examiner* — Tu X Nguyen
(74) *Attorney, Agent, or Firm* — Perkins Coie LLP

(57) ABSTRACT

A method for transmitting uplink data and a terminal device are provided. In the method: first downlink control information (DCI) used for scheduling transmission of first uplink data is received from a network device, the first DCI comprising indication information of first reference signal resource set and indication information of first reference signal resource; the first reference signal resource set is determined according to the indication information of the first reference signal resource set, the first reference signal resource set comprising at least one reference signal resource; at least one first reference signal resource is determined from the first reference signal resource set according to the indication information of the first reference signal resource; and a transmission parameter for transmission of the first uplink data is determined according to the at least one first reference signal resource.

14 Claims, 2 Drawing Sheets

(51) Int. Cl.
*H04L 5/00* (2006.01)
*H04W 52/14* (2009.01)
*H04W 52/42* (2009.01)

(52) U.S. Cl.
CPC ....... *H04W 52/42* (2013.01); *H04W 72/1289* (2013.01); *H04L 5/0007* (2013.01)

(58) Field of Classification Search
CPC ... H04W 16/28; H04W 52/221; H04W 52/36; H04W 72/046; H04W 52/362; H04W 52/58; H04W 52/04; H04W 52/143; H04W 52/228; H04W 40/08; H04W 40/10; H04W 52/18; H04W 52/226; H04W 52/06; H04W 52/12; H04W 52/32; H04W 52/545; H04W 72/04; H04W 52/34; H04W 52/00; H04B 7/0695; H04B 7/0617; H04B 7/0413
See application file for complete search history.

(56) References Cited

U.S. PATENT DOCUMENTS

2020/0162133 A1\* 5/2020 Harrison .............. H04B 7/0486
2020/0336264 A1\* 10/2020 Faxer .................. H04B 7/0456

OTHER PUBLICATIONS

Vivo, WF on SRS Resource Configurations, RAN1#91 R1-1721575, Oct. 2017.
Written Opinion of the International Search Authority in the international application No. PCT/CN2017/119323, dated Sep. 21, 2018.
Ericsson: "Non-codebook based UL MIMO remaining details", 3GPP Draft; R1-1721037, Nov. 18, 2017, XP051370398, Retrieved from the Internet: URL: http://www.3gpp. org/ftp/tsg%5Fran/WG1 %5FRL1/TSGR1 %5F91/Docs/[ retrieved on Nov. 18, 2017].
ZTE: "Discussion on RS for phase tracking", 3GPP Draft; R1-1712308, Aug. 20, 2017, XP051315124, Retrieved from the Internet: URL: http://www.3gpp.org/tp/Meetings_3GPPSYNC/RAN1/Docs/, [retrieved on Aug. 20, 2017].
OPPO: "On uplink power control for NR", 3GPP Draft; R1-1719968, Nov. 18, 2017, XP051369664, Retrieved from the Internet: URL: http://www.3gpp.org/tp/tsg%5Fran/WG1 %5FRL1/TSGR1 %5F91/ Docs/, [retrieved on Nov. 18, 2017].
Supplementary European Search Report in the European application No. 17936657.0, dated Nov. 20, 2020.
International Search Report in the international application No. PCT/CN2017/119323, dated Sep. 21, 2018.
First Office Action of the European application No. 17936657.0, dated Feb. 16, 2022. 6 pages.

\* cited by examiner

METHOD FOR TRANSMITTING UPLINK DATA AND TERMINAL DEVICE

CROSS-REFERENCE TO RELATED APPLICATION

This is a continuation application of International Patent Application No. PCT/CN2017/119323, filed on Dec. 28, 2017, the contents of which are hereby incorporated by reference in its entirety.

BACKGROUND

In a New Radio (NR) system, a terminal device may transmit uplink data by use of multiple panels. A panel includes a group of physical antennae, and each panel has an independent radio frequency channel. The terminal device may simultaneously transmit the data on the multiple panels. However, since different panels correspond to different channel conditions, different transmission parameters are required to be adopted for different panels according to respective channel information. For example, different beams, precoding and sending power may be adopted for different panels.

For obtaining these transmission parameters, it is necessary to configure different channel Sounding Reference Signal (SRS) resource sets for different panels to further obtain uplink channel information. How to enable a terminal device to acquire an SRS resource set corresponding to present data transmission and an adopted transmission parameter is a problem that needs to be solved.

SUMMARY

The disclosure relates to the field of communication.

The disclosure provides a method for uplink data transmission and a terminal device, which may flexibly configure a transmission parameter and improve data transmission efficiency.

In a first aspect, a method for uplink data transmission is provided, which may include that: first Downlink Control Information (DCI) used to schedule transmission of first uplink data is received from a network device, the first DCI including indication information of first reference signal resource set and indication information of first reference signal resource; the first reference signal resource set is determined according to the indication information of the first reference signal resource set, the first reference signal resource set including at least one reference signal resource; at least one first reference signal resource in the first reference signal resource set is determined according to the indication information of the first reference signal resource; and a transmission parameter for the transmission of the first uplink data is determined according to the at least one first reference signal resource.

It is to be understood that the indication information of the first reference signal resource set and the indication information of the first reference signal resource may be coded independently and may also be coded jointly.

In combination with the first aspect, in an implementation of the first aspect, the method may further include that: first configuration information sent by the network device is received, the first configuration information being used to indicate multiple reference signal resource sets; and the operation that the first reference signal resource set is determined according to the indication information of the first reference signal resource set may include that: the first reference signal resource set is determined from the multiple reference signal resource sets according to the indication information of the first reference signal resource set.

In combination with the first aspect and the abovementioned implementation thereof, in another implementation of the first aspect, the multiple reference signal resource sets may be used for transmission of reference signals on multiple panels.

In combination with the first aspect and the abovementioned implementations thereof, in another implementation of the first aspect, before the operation that the first configuration information sent by the network device is received, the method may further include that: information of the number of panels is sent to the network device, the information of the number of panels being used to indicate the number of panels of a terminal device and the information of the number of panels being used for the network device to determine the number of the multiple reference signal resource sets.

In combination with the first aspect and the abovementioned implementations thereof, in another implementation of the first aspect, there are one to one correspondences between the multiple reference signal resource sets and multiple Phase Tracking Reference Signal (PTRS) ports.

In combination with the first aspect and the abovementioned implementations thereof, in another implementation of the first aspect, the method may further include that: a first PTRS port corresponding to the first reference signal resource set is determined according to the correspondences between the multiple reference signal resource sets and the multiple PTRS ports; and an uplink PTRS is transmitted on a physical resource for the transmission of the first uplink data via the first PTRS port.

The network device configures different PTRS ports for different reference signal resource sets corresponding to different panels, so that phase changes of the corresponding panels may be tracked.

In combination with the first aspect and the abovementioned implementations thereof, in another implementation of the first aspect, the method may further include that: a first Physical Uplink Shared Channel (PUSCH) power control parameter set corresponding to the first reference signal resource set is determined according to correspondences between the multiple reference signal resource sets and multiple PUSCH power control parameter sets.

In combination with the first aspect and the abovementioned implementations thereof, in another implementation of the first aspect, the method may further include that: a power control parameter for PUSCH transmission scheduled by the first DCI is determined from the first PUSCH power control parameter set according to the indication information of the first reference signal resource.

The network device may configure different power control parameter sets for different panels, so that power control may be performed independently on signals transmitted on different panels.

In combination with the first aspect and the abovementioned implementations thereof, in another implementation of the first aspect, the indication information of the first reference signal resource may include an index of the at least one first reference signal resource.

In combination with the first aspect and the abovementioned implementations thereof, in another implementation of the first aspect, the indication information of the first reference signal resource may include a bitmap of the first reference signal resource set, and there are one to one correspondences between a bit in the bitmap and the reference signal resource in the first reference signal resource set.

In combination with the first aspect and the abovementioned implementations thereof, in another implementation of the first aspect, the transmission parameter for the transmission of the first uplink data may include at least one of: a precoding matrix, the number of transmission layers, the number of antenna ports, a transmit beam, a power control parameter or a panel.

In combination with the first aspect and the abovementioned implementations thereof, in another implementation of the first aspect, the at least one first resource signal resource may be an SRS resource, and the operation that the transmission parameter for the transmission of the first uplink data is determined according to the at least one first reference signal resource may include that: the number of antenna ports of the SRS resource and first Precoding Matrix Indicator (PMI) information of the SRS resource are determined; and a precoding matrix corresponding to the number of antenna ports of the SRS resource and first PMI information of the SRS resource is determined as a precoding matrix for the transmission of the first uplink data according to correspondences between the number of antenna ports, PMI information and precoding matrixes.

In combination with the first aspect and the abovementioned implementations thereof, in another implementation of the first aspect, the first DCI may include the first PMI information.

In such a manner, the precoding matrix for the transmission of the first uplink data scheduled by the first DCI can be obtained based on the method, so that independent precoding matrixes may be adopted for data transmission on different panels, and uplink scheduling flexibility is further improved.

In combination with the first aspect and the abovementioned implementations thereof, in another implementation of the first aspect, the at least one first reference signal resource may be an SRS resource, and the operation that the transmission parameter for the transmission of the first uplink data is determined according to the at least one first reference signal resource may include that: the total number of antenna ports of the at least one SRS resource and/or the number of the at least one SRS resource are/is determined as the number of transmission layers for the transmission of the first uplink data.

In combination with the first aspect and the abovementioned implementations thereof, in another implementation of the first aspect, the at least one first reference signal resource may be an SRS resource, and the operation that the transmission parameter for the transmission of the first uplink data is determined according to the at least one first reference signal resource may include that: a precoding matrix for transmission of an SRS in the SRS resource is determined as the precoding matrix for the transmission of the first uplink data.

In combination with the first aspect and the abovementioned implementations thereof, in another implementation of the first aspect, the at least one first reference signal resource may be K SRS resources, K being equal to the number of data transmission layers corresponding to the transmission of the first uplink data, and the operation that the precoding matrix for transmission of the SRS in the SRS resource is determined as the precoding matrix for the transmission of the first uplink data may include that: K precoding matrixes for the K SRS resources are determined; and the K precoding matrixes are determined as precoding matrixes of the K data transmission layers, and there are one to one correspondences between the K precoding matrixes and the K data transmission layers.

Therefore, uplink transmission corresponding to different SRS resources may adopts precoding matrixes as the same as those for the SRS resources for matching with channel information of panels transmitting corresponding data.

In combination with the first aspect and the abovementioned implementations thereof, in another implementation of the first aspect, the at least one first reference signal resource may be at least one SRS resource, and the operation that the transmission parameter for the transmission of the first uplink data is determined according to the at least one first reference signal resource may include that: the total number of antenna ports of the at least one SRS resource and/or the number of the at least one SRS resource are/is determined as the number of antenna ports for the transmission of the first uplink data.

For example, if the at least one SRS resource is one SRS resource, the terminal device may determine the number of antenna ports of the one SRS resource as the number of antenna ports for the transmission of the first uplink data.

For another example, if the at least one SRS resource is multiple SRS resources, each SRS resource being a single-port SRS resource, the terminal device may determine the number of the multiple SRS resources as the number of antenna ports for the transmission of the first uplink data.

In such a manner, the number of antenna ports for uplink data transmission can be obtained through the method, so that the independent number of antenna ports may be adopted for data transmission on different panels, and uplink multi-panel scheduling flexibility is further improved.

In combination with the first aspect and the abovementioned implementations thereof, in another implementation of the first aspect, the at least one first reference signal resource may be a Channel State Information Reference Signal (CSI-RS) resource, and the operation that the transmission parameter for the transmission of the first uplink data is determined according to the at least one first reference signal resource may include that: corresponding downlink channel information is determined according to a CSI-RS on the CSI-RS resource; the downlink channel information is determined as uplink channel information; and the transmit beam and/or the precoding matrix for the transmission of the first uplink data are/is determined according to the uplink channel information.

Therefore, the network device may configure different CSI-RS resources for data transmission on different panels to further obtain uplink channel information, and the channel information obtained in such a manner is more accurate.

In combination with the first aspect and the abovementioned implementations thereof, in another implementation of the first aspect, the operation that the transmission parameter for the transmission of the first uplink data is determined according to the at least one first reference signal resource may include that: a beam receiving or sending a reference signal in the at least one first reference signal resource is determined as a beam for the transmission of the first uplink data.

For example, the at least one first reference signal resource is an SRS resource, and the terminal device determines a beam for sending an SRS on the SRS resource as the transmit beam for the transmission of the first uplink data.

For another example, the at least one first reference signal resource is a CSI-RS resource, and the terminal device determines a beam for receiving a CSI-RS on the CSI-RS resource as a receiving beam for the transmission of the first uplink data.

In combination with the first aspect and the abovementioned implementations thereof, in another implementation of the first aspect, the at least one first reference signal resource may be K SRS resources, K being equal to the number of the data transmission layers corresponding to the transmission of the first uplink data, and the operation that the beam receiving or sending the reference signal in the at least one first reference signal resource is determined as the beam for the transmission of the first uplink data may include that: K transmit beams for sending SRS resources of the K SRS resources are determined; and the K transmit beams are determined as transmit beams of the K data transmission layers, and there are one to one correspondences between the K transmit beams and the K data transmission layers.

Therefore, uplink transmission corresponding to different reference signal resources may adopt different beams for matching with channel information of panels transmitting corresponding data.

In combination with the first aspect and the abovementioned implementations thereof, in another implementation of the first aspect, the operation that the transmission parameter for the transmission of the first uplink data is determined according to the at least one first reference signal resource may include that: a power control parameter corresponding to the at least one first reference signal resource is determined as a sending power for the transmission of the first uplink data according to correspondences between reference signal resources and power control parameters.

In combination with the first aspect and the abovementioned implementations thereof, in another implementation of the first aspect, the method may further include that: a power control parameter corresponding to the indication information of the first reference signal resource is determined as the a sending power for the transmission of the first uplink data according to correspondences between reference signal resource indication information and power control parameters.

In combination with the first aspect and the abovementioned implementations thereof, in another implementation of the first aspect, the power control parameter may include at least one of: an open loop power control parameter, a closed loop power control parameter or an estimated path loss value.

Therefore, uplink transmission corresponding to different reference signal resources may adopt different sending power for matching with channel gains of beams or panels transmitting corresponding data.

In combination with the first aspect and the abovementioned implementations thereof, in another implementation of the first aspect, the operation that the transmission parameter for the transmission of the first uplink data is determined according to the at least one first reference signal resource may include that: a panel receiving or sending the reference signal in the at least one first reference signal resource is determined as a panel for the transmission of the first uplink data.

For example, the at least one first reference signal resource is an SRS resource, and the terminal device determines a panel for sending an SRS on the SRS resource as a panel for the transmission of first uplink data.

For another example, the at least one first reference signal resource is a CSI-RS resource, and the terminal device determines a panel for receiving a CSI-RS on the CSI-RS resource as a panel for the transmission of first uplink data.

In such a manner, different panels may be adopted for uplink transmission corresponding to different reference signal resources, so that a better panel may be selected for data transmission according to a reference signal, or multiple panels of the terminal can be fully utilized to transmit data at the same time, and thus uplink transmission performance can be improved.

In combination with the first aspect and the abovementioned implementations thereof, in another implementation of the first aspect, the method may further include that: second DCI sent by the network device is received at the same time of receiving the first DCI.

In such a manner, the terminal may simultaneously detect at least two DCIs and schedule data transmission on different panels respectively, so that simultaneous uplink transmissions on different panels are supported, and the uplink transmission spectrum efficiency is improved.

The operation that the second DCI is received at the same time of receiving the first DCI includes that: the terminal device receives the first DCI and the second DCI in the same slot, or, the terminal device receives the first DCI and the second DCI in the same Orthogonal Frequency Division Multiplexing (OFDM) symbol, or the terminal device detects the first DCI and the second DCI in the same control channel.

In combination with the first aspect and the abovementioned implementations thereof, in another implementation of the first aspect, the second DCI may include indication information of second reference signal resource set, and the method may further include that: a second reference signal resource set is determined according to the indication information of the second reference signal resource set, the second reference signal resource set being different from the first reference signal resource set.

In combination with the first aspect and the abovementioned implementations thereof, in another implementation of the first aspect, Demodulation Reference Signal (DMRS) ports for the transmission of the first uplink data scheduled by the first DCI are different from DMRS ports for transmission of second uplink data scheduled by the second DCI.

In a second aspect, a terminal device is provided, which is configured to execute the method in the first aspect or any possible implementation of the first aspect. Specifically, the terminal device includes units configured to execute the method in the first aspect or any possible implementation of the first aspect.

In a third aspect, a terminal device is provided, which includes a storage unit and a processor. The storage unit is configured to store an instruction. The processor is configured to execute the instruction stored in a memory. When the processor executes the instruction stored in the memory, such execution enables the processor to execute the method in the first aspect or any possible implementation of the first aspect.

In a fourth aspect, a computer-readable medium is provided, which is configured to store a computer program, the computer program including an instruction configured to execute the method in the first aspect or any possible implementation of the first aspect.

In a fifth aspect, a computer program product including an instruction is provided. When a computer runs the instruction of the computer program product, the computer executes the method for uplink data transmission in the first aspect or any possible implementation of the first aspect. Specifically, the computer program product may run in the terminal device of the second aspect.

DETAILED DESCRIPTION

It will be appreciated by persons skilled in the art that the objects that could be achieved with the present disclosure are not limited to what has been particularly described hereinabove and other objects that the present disclosure could achieve will be more clearly understood from the following detailed description taken in conjunction with the accompanying drawings.

The technical solutions of the implementations of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a future 5th Generation (5G) system or NR.

In the implementations of the disclosure, a terminal device may refer to user equipment, an access terminal, a user unit, a user station, a mobile station, a mobile radio station, a remote station, a remote terminal, a mobile device, a user terminal, a terminal, a wireless communication device, a user agent or a user device. The terminal device may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle device, a wearable device, a terminal device in a future 5G network, a terminal device in a future evolved Public Land Mobile Network (PLMN) or the like. There are no limits made thereto in the implementations of the disclosure.

In the implementations of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle device, a wearable device, a network device in the future 5G network, a network device in the future evolved PLMN or the like. There are no limits made in the implementations of the disclosure.

Figure 1:
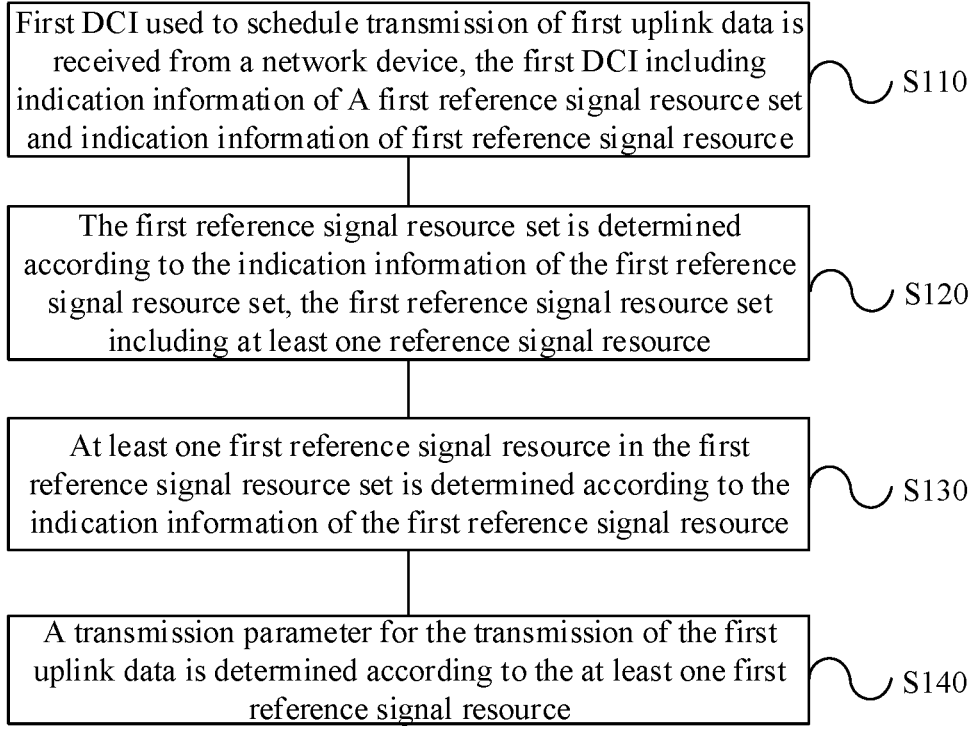
FIG. 1 is a schematic flowchart of a method for uplink data transmission according to an implementation of the disclosure.

FIG. 1 is a schematic flowchart of a method for uplink data transmission 100 according to an implementation of the disclosure. The method 100 may be executed by a terminal device. As illustrated in FIG. 1, the method 100 includes the following steps. In S110, first DCI used to schedule the transmission of the first uplink data is received from a network device, the first DCI including indication information of first reference signal resource set and indication information of first reference signal resource. In S120, the first reference signal resource set is determined according to the indication information of the first reference signal resource set, the first reference signal resource set including at least one reference signal resource. In S130, at least one first reference signal resource in the first reference signal resource set is determined according to the indication information of the first reference signal resource. In S140, a transmission parameter for the transmission of the first uplink data is determined according to the at least one first reference signal resource.

It is to be understood that, in the embodiment of the disclosure, the reference signal resource set may include at least one reference signal resource, each reference signal resource set is used for the same function but different sets may have different functions. Different reference signal resources in the same reference signal resource set have at least one parameter that is the same. For example, the same parameter may be at least one of the following parameters: a power control parameter, a transmission bandwidth parameter, the number of antenna ports of the SRS resource, the number of OFDM symbols occupied in a slot, the number of signal replications in a slot, a function configuration and a transmission slot. However, the embodiment of the disclosure is not limited thereto. A network side may configure the same parameter for each reference signal resource set and is not required to configure the parameter for each reference signal resource in the set, so that a signaling overhead is reduced.

It is to be understood that, in the embodiment of the disclosure, the reference signal resource set may be an SRS resource set, and the SRS resource set includes at least one SRS resource, the SRS resource being used to transmit an SRS; or, the reference signal resource set may also be a CSI-RS resource set, and the CSI-RS resource set may include at least one CSI-RS resource, the CSI-RS resource being used to transmit a CSI-RS. However, the embodiment of the disclosure is not limited thereto.

In an implementation of the disclosure, in S110, the terminal device receives the first DCI sent by the network device, the first DCI may be used to schedule the transmission of the first uplink data, and the first DCI may include the indication information of the first reference signal resource set and the indication information of the first reference signal resource. The indication information of the first reference signal resource set and the indication information of the first reference signal resource may be coded independently and may also be coded jointly, and the embodiment of the disclosure is not limited thereto.

It is to be understood that, before the operation in S120 that the terminal device determines the first reference signal resource set according to the indication information of the first reference signal resource set, the method 100 may further include that: the terminal device receives first configuration information sent by the network device, the first configuration information being used to indicate multiple reference signal resource sets. Correspondingly, the operation that the terminal device determines the first reference signal resource set according to the indication information of the first reference signal resource set may specifically include that: the first reference signal resource set is determined from the multiple reference signal resource sets according to the indication information of the first reference signal resource set.

It is to be understood that, in the embodiment of the disclosure, the terminal device may have one or more panels for the transmission of uplink data, and each panel has an independent radio frequency channel.

Correspondingly, the multiple reference signal resource sets may be used for transmission of reference signals on multiple panels. Different reference signal resource sets may be used for transmission of reference signals on different panels.

Optionally, the network device may configure the corresponding number of the multiple reference signal resource sets according to the number of the panels in the terminal device. Specifically, the terminal device may send information of the number of panels to the network device, the information of the number of panels being used to indicate the number of the panels of the terminal device, and then the network device receives the information of the number of panels, determines the number, equal to the number of the panels, of the multiple reference signal resource sets according to the information of the number of panels, and sends the first configuration information to the terminal device, the first configuration information indicating the multiple reference signal resource sets.

Correspondingly, the terminal device makes the multiple reference signal resource sets corresponding to the multiple panels one to one, namely the terminal device implements transmission of the corresponding panel according to the first reference signal resource set indicated by the indication information of the first reference signal resource set in the first DCI.

In such a manner, the network device may obtain uplink channel information of different panels and further schedule data transmission on the panels.

In an implementation of the disclosure, the multiple reference signal resource sets may also correspond to multiple PTRS ports one to one, namely different reference signal resource sets correspond to different PTRS ports. Specifically, the terminal device may determine a first PTRS port corresponding to the first reference signal resource set according to correspondences between the multiple reference signal resource sets and the multiple PTRS ports, and transmit an uplink PTRS on a physical resource for the transmission of the first uplink data via the first PTRS port.

Optionally, the multiple PTRS ports corresponding to the multiple reference signal resource sets one to one may be configured for the terminal device by the network device through downlink signaling.

In such a manner, the network device may configure different PTRS ports for different reference signal resource sets corresponding to different panels, thereby tracking phase changes of the corresponding panels.

In an implementation of the disclosure, different reference signal resource sets of the multiple reference signal resource sets correspond to different PUSCH power control parameters. Specifically, the terminal device may determine a first PUSCH power control parameter set corresponding to the first reference signal resource set according to correspondences between the multiple reference signal resource sets and PUSCH power control parameter sets.

Furthermore, the terminal device may further determine, according to the indication information of the first reference signal resource, a power control parameter for PUSCH transmission scheduled by the first DCI from the first PUSCH power control parameter set.

In such a manner, the network device may configure different power control parameter sets for different panels, so that power control may be performed independently on signals transmitted on different panels.

In S130, the terminal device determines one first reference signal resource in the first reference signal resource set according to the indication information of the first reference signal resource. Specifically, the indication information of the first reference signal resource may include an index of the at least one first reference signal resource, or, the indication information of the first reference signal resource may further include a bitmap of the first reference signal resource set.

Optionally, if the indication information of the first reference signal resource indicates one first reference signal resource, the indication information of the first reference signal resource may include an index of the first reference signal resource. Specifically, the terminal device determines an index of each reference signal resource in the first reference signal resource set, and determines the corresponding first reference signal resource according to the index included in the indication information of the first reference signal resource.

Optionally, if the indication information of the first reference signal resource indicates multiple first reference signal resources, the indication information of the first reference signal resource may include the bitmap, and there are one to one correspondences between the bitmaps and the reference signal resources in the first reference signal resource set. Specifically, if the terminal device determines that the first reference signal resource set includes N reference signal resources, a length of the bitmap in the indication information of the first reference signal resource is equal to the number N of the reference signal resources in the first reference signal resource set, and it may be indicated through the bitmap that M reference signal resources of the N reference signal resources are the at least one first reference signal resource indicated by the indication information of the first reference signal resource, N and M being positive integers and M being less than or equal to N.

For example, if any bit in the bitmap is "1", it indicates SELECT, and if the bit is "0", it indicates NOT SELECT. That is, it may be obtained through the bitmap that all the reference signal resources corresponding to bit "1" are the at least one first reference signal resource indicated by the bitmap.

In S140, the terminal device determines the transmission parameter for the transmission of the first uplink data according to the at least one first reference signal resource, the transmission parameter for the transmission of the first uplink data including at least one of: a precoding matrix, the number of transmission layers, the number of antenna ports, a transmit beam, a power control parameter or a panel.

Optionally, as an implementation, if the at least one first reference signal resource is at least one SRS resource, the terminal device may determine the precoding matrix for the transmission of the first uplink data according to correspondences between the number of antenna ports, PMI information and precoding matrixes. Specifically, the terminal device determines the number of antenna ports of the at least one SRS resource and first PMI information of the at least one SRS resource, and determines a precoding matrix corresponding to the number of antenna ports of the at least one SRS resource and first PMI information of the at least one SRS resource as a precoding matrix for the transmission of the first uplink data according to the correspondences between the number of antenna ports of the SRS resource, the PMI information and the precoding matrixes.

Optionally, the first DCI received by the terminal device from the network device may include the first PMI information.

Optionally, the correspondences between the number of antenna ports, the PMI information and the precoding matrixes may be predetermined.

Optionally, the number of antenna ports of the at least one SRS resource is equal to the number of antenna ports of a panel transmitting the at least one SRS.

In such a manner, the precoding matrix for the transmission of the first uplink data scheduled by the first DCI is obtained based on the method, so that independent precoding matrixes may be adopted for data transmission on different panels, and uplink scheduling flexibility is further improved.

Optionally, as an implementation, if the at least one first reference signal resource is at least one SRS resource, the terminal device may determine a total number of antenna ports of the at least one SRS resource and/or the number of the at least one SRS resource as the number of transmission layers for the transmission of the first uplink data. For example, if the at least one SRS resource includes K SRS resources, the number of transmission layers for the transmission of the first uplink data is K.

Optionally, as an implementation, if the at least one first reference signal resource is at least one SRS resource, the terminal device may determine a precoding matrix for transmission of an SRS in the SRS resource as a precoding matrix for the transmission of the first uplink data.

Specifically, if the at least one SRS resource includes K SRS resources, K being equal to the number of data transmission layers corresponding to the transmission of the first uplink data, the terminal device determines K precoding matrixes for the K SRS resources and determines the K precoding matrixes as precoding matrixes of the K data transmission layers respectively, and there are one to one correspondences between the K precoding matrixes and the K data transmission layers, namely one precoding matrix corresponding to one data transmission layer.

Therefore, uplink transmission corresponding to different SRS resources may adopt precoding matrixes as the same as those for the SRS resources for matching with channel information of panels transmitting corresponding data.

Optionally, as an implementation, if the at least one first reference signal resource is at least one SRS resource, the terminal device determines a total number of antenna ports of the at least one SRS resource and/or the number of the at least one SRS resource as the number of antenna ports for the transmission of the first uplink data.

For example, if the at least one SRS resource is one SRS resource, the terminal device may determine the number of antenna ports of the one SRS resource as the number of antenna ports for the transmission of the first uplink data.

For another example, if the at least one SRS resource is multiple SRS resources, each SRS resource being a single-port SRS resource, the terminal device may determine the number of the multiple SRS resources as the number of antenna ports for the transmission of the first uplink data.

Optionally, for codebook-based transmission, the terminal device may further determine a corresponding codebook based on the number of antenna ports for the transmission of the first uplink data, and for non-codebook-based transmission, the terminal device may determine the number of transmission layer for the corresponding uplink data according to the number of antenna ports.

In such a manner, the number of antenna ports for the transmission of uplink data is obtained through the method, so that independent antenna port numbers may be adopted for data transmission on different panels, and uplink multi-panel scheduling flexibility is further improved.

Optionally, as an implementation, if the at least one first reference signal resource is a CSI-RS resource, the terminal device may determine downlink channel information according to a CSI-RS on the CSI-RS resource, determine the downlink channel information as uplink channel information and determine the transmit beam and/or a precoding matrix for the transmission of the first uplink data according to the uplink channel information.

Specifically, the terminal device determines the corresponding downlink channel information according to the CSI-RS on the CSI-RS resource. The terminal device determines the downlink channel information as the uplink channel information based on channel reciprocity, and may further determine the transmit beam and/or the precoding matrix for the transmission of the first uplink data according to the uplink channel information.

Therefore, the network device may configure different CSI-RS resources for data transmission on different panels to further obtain uplink channel information, and the channel information obtained in such a manner is more accurate.

Optionally, as an implementation, the terminal device may determine a beam receiving or sending reference signals in the at least one first reference signal resource as a beam for the transmission of the first uplink data.

For example, the at least one first reference signal resource is an SRS resource, and the terminal device determines a beam for sending an SRS on the SRS resource as the transmit beam for the transmission of the first uplink data.

For another example, the at least one first reference signal resource is a CSI-RS resource, and the terminal device determines a beam for receiving a CSI-RS on the CSI-RS resource as a receiving beam for the transmission of the first uplink data.

For another example, the at least one first reference signal resource is K SRS resources, K being equal to the number of the data transmission layers corresponding to the transmission of the first uplink data, and the terminal device determines K transmit beams for sending the SRS resources of the K SRS resources and determines the K transmit beams as transmit beams of the K data transmission layers Herein, there are one to one correspondences between the K transmit beams and the K data transmission layers.

Therefore, uplink transmission corresponding to different reference signal resources may adopt different beams for matching with channel information of panels transmitting corresponding data.

Optionally, as an implementation, the terminal device may determine a power control parameter corresponding to the at least one first reference signal resource as a sending power for the transmission of the first uplink data according to correspondences between reference signal resources and power control parameters.

Or, the terminal device may also determine a power control parameter corresponding to the indication information of the first reference signal resource as the a sending power for the transmission of the first uplink data according to correspondences between indication information of reference signal resources and power control parameters.

It is to be understood that the reference signal resource may be an SRS resource and correspondences between the SRS resource and power control parameters, and/or correspondences between SRS Resource Indicators (SRI) and power control parameters may be pre-configured for the terminal device by the network device. The embodiment of the disclosure is not limited thereto.

It is to be understood that the power control parameter may include at least one of an open loop power control parameter, a closed loop power control parameter or an estimated path loss value.

Therefore, uplink transmission corresponding to different reference signal resources may adopt different sending power for matching with channel gains of beams or panels for transmitting corresponding data.

Optionally, as an implementation, the terminal device may determine a panel receiving or sending the reference signal in the at least one first reference signal resource as a panel for the transmission of the first uplink data.

For example, the at least one first reference signal resource is an SRS resource, and the terminal device determines a panel for sending an SRS on the SRS resource as the panel for transmitting first uplink data.

For another example, the at least one first reference signal resource is a CSI-RS resource, and the terminal device determines a panel for receiving a CSI-RS on the CSI-RS resource as the panel for transmitting the first uplink data.

In such a manner, different panels may be adopted for uplink transmission corresponding to different reference signal resources, so that a better panel may be selected for data transmission according to reference signals, or multiple panels of the terminal can be fully utilized to transmit data at the same time, and uplink transmission performance can be improved.

In the embodiment of the disclosure, the method 100 may further include that: second DCI sent by the network device is received at the same time of receiving the first DCI, namely the terminal device simultaneously receives at least two DCIs, the at least two DCIs including the first DCI and the second DCI.

In such a manner, the terminal may simultaneously detect at least two DCIs and schedule data transmission on different panels respectively, so that simultaneous uplink transmission on different panels is supported, and the uplink transmission spectrum efficiency is improved.

It is to be understood that the operation that the second DCI is received at the same time of receiving the first DCI may include that: the terminal device receives the first DCI and the second DCI in the same slot, or, the terminal device receives the first DCI and the second DCI in the same OFDM symbol, or the terminal device detects the first DCI and the second DCI in the same control channel. The embodiment of the disclosure is not limited thereto.

It is to be understood that the second DCI includes indication information of second reference signal resource set. Correspondingly, the method 100 further includes that: the terminal device determines the second reference signal resource set according to the indication information of the second reference signal resource set, the second reference signal resource set being different from the first reference signal resource set.

In the embodiment of the disclosure, a DMRS port group may correspond to a panel, a panel may correspond to multiple DMRS ports, and the terminal device, after determining a transmission parameter of a panel, may transmit data of the corresponding DMRS port group on the panel. Correspondingly, DMRS ports for the transmission of the first uplink data scheduled by the terminal device through the first DCI are different from DMRS ports for transmission of second uplink data scheduled by the second DCI.

For example, the first DCI schedules first uplink transmission, and a DMRS port 0 and a DMRS port 1 are adopted for first uplink transmission; and the second DCI schedules second uplink transmission, and a DMRS port 2 and a DMRS port 3 are adopted for second uplink transmission.

In such a manner, according to the method for uplink data transmission of the embodiment of the disclosure, the terminal device receives multiple DCIs sent by the network device, different DCI being used to schedule uplink transmission on different panels, and determines uplink channel information of the corresponding panels according to different resource sets indicated in different DCI, and then independent transmission parameters may be adopted for data transmission of multiple panels, so that the multi-panel transmission flexibility and the uplink spectrum efficiency may be improved.

It is to be understood that, in various implementations of the disclosure, a magnitude of a sequence number of each process does not mean an execution sequence, and the execution sequence of each process should be determined by its function and an internal logic and should not form any limit to an implementation process of the implementations of the disclosure.

In addition, term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The method for uplink data transmission according to the implementation of the disclosure is described above in combination with FIG. 1 in detail, and a terminal device according to the implementation of the disclosure will be described below in combination with FIG. 2 to FIG. 3.

Figure 2:
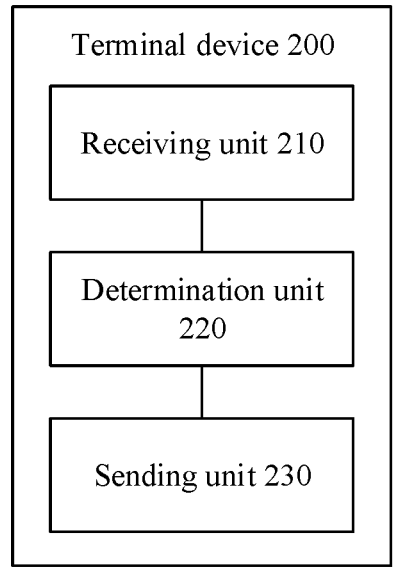
FIG. 2 is a schematic block diagram of a terminal device according to an implementation of the disclosure.

As illustrated in FIG. 2, a terminal device 200 according to an implementation of the disclosure includes a receiving unit 210 and a determination unit 220, and optionally, may further include a sending unit 230.

Specifically, the receiving unit 210 is configured to receive first DCI used to schedule the transmission of the first uplink data from a network device, the first DCI including indication information of first reference signal resource set and the indication information of the first reference signal resource. The determination unit 220 is configured to determine the first reference signal resource set according to the indication information of the first reference signal resource set, the first reference signal resource set including at least one reference signal resource. The determination unit 220 is further configured to determine at least one first reference signal resource in the first reference signal resource set according to the indication information of the first reference signal resource. The determination unit 220 is further configured to determine a transmission parameter for the transmission of the first uplink data according to the at least one first reference signal resource.

Optionally, the receiving unit 210 is further configured to receive first configuration information sent by the network device, the first configuration information being used to indicate multiple reference signal resource sets. The determination unit 220 is specifically configured to determine the first reference signal resource set from the multiple reference signal resource sets according to the indication information of the first reference signal resource set.

Optionally, the multiple reference signal resource sets are used for transmission of reference signals on multiple panels.

Optionally, the sending unit 230 is configured to, before the receiving unit 210 receives the first configuration information sent by the network device, send information of the number of panels to the network device, the information of the number of panels being used to indicate the number of panels of the terminal device, and the information of the number of panels being configured for the network device to determine the number of the multiple reference signal resource sets.

Optionally, there are one to one correspondences between the multiple reference signal resource sets and multiple PTRS ports.

Optionally, the determination unit 220 is further configured to determine a first PTRS port corresponding to the first reference signal resource set according to correspondences between the multiple reference signal resource sets and the multiple PTRS ports, and transmit an uplink PTRS on a physical resource for the transmission of the first uplink data via the first PTRS port.

Optionally, the determination unit 220 is further configured to determine a first PUSCH power control parameter set corresponding to the first reference signal resource set according to correspondences between the multiple reference signal resource sets and PUSCH power control parameter sets.

Optionally, the determination unit 220 is further configured to determine, according to the indication information of the first reference signal resource, a power control parameter for PUSCH transmission scheduled by the first DCI from the first PUSCH power control parameter set.

Optionally, the transmission parameter for the transmission of the first uplink data includes at least one of a precoding matrix, the number of transmission layers, the number of antenna ports, a transmit beam, a power control parameter or a panel.

Optionally, the at least one first reference signal resource is an SRS resource, and the determination unit 220 is specifically configured to: determine the number of antenna ports of the SRS resource and first PMI information of the SRS resource, and determine a precoding matrix corresponding to the number of antenna ports of the SRS resource and first PMI information of the SRS resource as a precoding matrix for the transmission of the first uplink data according to correspondences between the number of antenna ports, PMI information and precoding matrixes.

Optionally, the first DCI includes the first PMI information.

Optionally, the at least one first reference signal resource is SRS resource, and the determination unit 220 is specifically configured to determine a total number of antenna ports of the at least one SRS resource and/or the number of the at least one SRS resource as the number of transmission layers for the transmission of the first uplink data.

Optionally, the at least one first reference signal resource is an SRS resource, and the determination unit 220 is specifically configured to determine a precoding matrix for transmission of an SRS in the SRS resource as the precoding matrix for the transmission of the first uplink data.

Optionally, the at least one first reference signal resource is K SRS resources, K being equal to the number of data transmission layers corresponding to the transmission of the first uplink data, and the determination unit 220 is specifically configured to: determine K precoding matrixes for the K SRS resources, and determine the K precoding matrixes as precoding matrixes of the K data transmission layers, herein there are one to one correspondences between the K precoding matrixes and the K data transmission layers.

Optionally, the at least one first reference signal resource is at least one SRS resource, and the determination unit 220 is specifically configured to determine a total number of antenna ports of the at least one SRS resource and/or number of the at least one SRS resource as the number of antenna ports for the transmission of the first uplink data.

Optionally, the at least one first reference signal resource is a CSI-RS resource, and the determination unit 220 is specifically configured to: determine corresponding downlink channel information according to a CSI-RS on the CSI-RS resource, determine the downlink channel information as uplink channel information, and determine the transmit beam and/or the precoding matrix for the transmission of the first uplink data according to the uplink channel information.

Optionally, the determination unit 220 is specifically configured to determine a beam receiving or sending a reference signal in the at least one first reference signal resource as a beam for the transmission of the first uplink data.

Optionally, the at least one first reference signal resource is K SRS resources, K being equal to the number of the data transmission layers corresponding to the transmission of the first uplink data, and the determination unit 220 is specifically configured to determine K transmit beams for sending SRS resources of the K SRS resources, and determine the K transmit beams as transmit beams of the K data transmission layers, herein there are one to one correspondences between the K transmit beams and the K data transmission layers.

Optionally, the determination unit 220 is specifically configured to determine a power control parameter corresponding to the at least one first reference signal resource as a sending power for the transmission of the first uplink data according to correspondences between reference signal resources and power control parameters.

Optionally, the determination unit 220 is specifically configured to determine a power control parameter corresponding to the indication information of the first reference signal resource as a sending power for the transmission of the first uplink data according to correspondences between indication information of reference signal resources and power control parameters.

Optionally, the power control parameter includes at least one of an open loop power control parameter, a closed loop power control parameter or an estimated path loss value.

Optionally, the determination unit 220 is specifically configured to determine a panel receiving or sending the reference signal in the at least one first reference signal resource as a panel for the transmission of the first uplink data.

Optionally, the at least one first reference signal resource is an SRS resource or a CSI-RS resource.

Optionally, the receiving unit 210 is further configured to receive second DCI sent by the network device at the same time of receiving the first DCI.

Optionally, the second DCI includes indication information of a second reference signal resource set, and the determination unit 220 is specifically configured to determine the second reference signal resource set according to the indication information of the second reference signal resource set, the second reference signal resource set being different from the first reference signal resource set.

Optionally, DMRS ports for the transmission of the first uplink data scheduled by the first DCI are different from DMRS ports for transmission of second uplink data scheduled by the second DCI. It is to be understood that the terminal device 200 according to the embodiment of the disclosure may correspondingly execute the method 100 in the embodiment of the disclosure and the abovementioned and other operations and/or functions of each unit in the terminal device 200 are adopted to implement the corresponding flows executed by the terminal device in each method in FIG. 1 respectively and will not be elaborated herein for simplicity.

In such a manner, the terminal device of the embodiment of the disclosure receives multiple DCIs sent by the network device, different DCI being used to schedule uplink transmission on different panels, and determines uplink channel information of the corresponding panels according to different resource sets indicated in different DCI, and then independent transmission parameters may be adopted for data transmission of multiple panels, so that the multi-panel transmission flexibility and the uplink spectrum efficiency may be improved.

Figure 3:
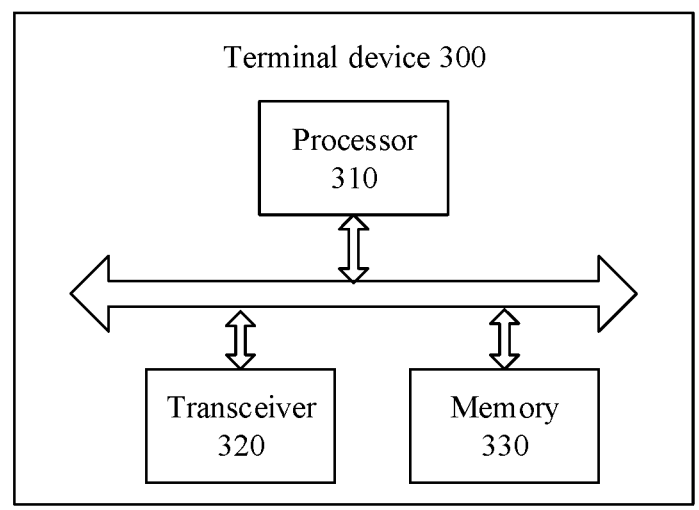
FIG. 3 is another schematic block diagram of a terminal device according to an implementation of the disclosure.

FIG. 3 is a schematic block diagram of a terminal device 300 according to an implementation of the disclosure. As illustrated in FIG. 3, the terminal device 300 includes: a processor 310 and a transceiver 320. The processor 310 is connected with the transceiver 320. Optionally, the terminal device 300 further includes a memory 330. The memory 330 is connected with the processor 310. The processor 310, the memory 330 and the transceiver 320 communicate with one another through an internal connecting path to transmit and/or control data signals. The memory 330 may be configured to store an instruction. The processor 310 is configured to execute the instruction stored in the memory 330 to control the transceiver 320 to send information or signals. The transceiver 320 is configured to receive first DCI used to schedule the transmission of the first uplink data from a network device, the first DCI including indication information of a first reference signal resource set and the indication information of the first reference signal resource. The processor 310 is configured to determine the first reference signal resource set according to the indication information of the first reference signal resource set, the first reference signal resource set including at least one reference signal resource. The processor 310 is configured to determine at least one first reference signal resource in the first reference signal resource set according to the indication information of the first reference signal resource. The processor 310 is configured to determine a transmission parameter for the transmission of the first uplink data according to the at least one first reference signal resource.

Optionally, as an implementation, the transceiver 320 is configured to receive first configuration information sent by the network device, the first configuration information being used to indicate multiple reference signal resource sets. The processor 310 is configured to determine the first reference signal resource set from the multiple reference signal resource sets according to the indication information of the first reference signal resource set.

Optionally, as an implementation, the multiple reference signal resource sets are used for transmission of reference signals on multiple panels.

Optionally, as an implementation, the transceiver 320 is configured to, before the receiving unit 210 receives the first configuration information sent by the network device, send information of the number of panels to the network device, the information of the number of panels being used to indicate the number of panels of the terminal device and the information of the number of panels being used for the network device to determine the number of the multiple reference signal resource sets.

Optionally, as implementation, there are one to one correspondences between the multiple reference signal resource sets and multiple PTRS ports.

Optionally, as an implementation, the processor 310 is configured to determine a first PTRS port corresponding to the first reference signal resource set according to the correspondences between the multiple reference signal resource sets and the multiple PTRS ports and transmit an uplink PTRS on a physical resource for the transmission of the first uplink data via the first PTRS port.

Optionally, as an implementation, the processor 310 is configured to determine a first PUSCH power control parameter set corresponding to the first reference signal resource set according to correspondences between the multiple reference signal resource sets and the multiple PUSCH power control parameter sets.

Optionally, as an implementation, the processor 310 is further configured to determine, according to the indication information of the first reference signal resource, a power control parameter for PUSCH transmission scheduled by the first DCI from the first PUSCH power control parameter set.

Optionally, as an implementation, the transmission parameter for the transmission of the first uplink data includes at least one of a precoding matrix, the number of transmission layers, the number of antenna ports, a transmit beam, a power control parameter or a panel.

Optionally, as an implementation, the at least one first reference signal resource is an SRS resource, and the processor 310 is configured to determine the number of antenna ports of the SRS resource and first PMI information of the SRS resource and determine a precoding matrix corresponding to the number of antenna ports of the SRS resource and first PMI information of the SRS resource as a precoding matrix for the transmission of the first uplink data according to correspondences between the number of antenna ports, PMI information and precoding matrixes.

Optionally, as an implementation, the first DCI includes the first PMI information.

Optionally, as an implementation, the at least one first reference signal resource is SRS resource, and the processor 310 is configured to determine a total number of antenna ports of the at least one SRS resource and/or the number of the at least one SRS resource as the number of transmission layers for the transmission of the first uplink data.

Optionally, as an implementation, the at least one first reference signal resource is an SRS resource, and the processor 310 is configured to determine a precoding matrix for transmission of an SRS in the SRS resource as a precoding matrix for the transmission of the first uplink data.

Optionally, as an implementation, the at least one first reference signal resource is K SRS resources, K being equal to the number of data transmission layers corresponding to the transmission of the first uplink data, and the processor 310 is configured to determine K precoding matrixes for the K SRS resources and determine the K precoding matrixes as precoding matrixes of the K data transmission layers, herein there are one to one correspondences between the K precoding matrixes and the K data transmission layers.

Optionally, as an implementation, the at least one first reference signal resource is at least one SRS resource, and the processor 310 is configured to determine a total number of antenna ports of the at least one SRS resource and/or the number of the at least one SRS resource as the number of antenna ports for the transmission of the first uplink data.

Optionally, as an implementation, the at least one first reference signal resource is a CSI-RS resource, and the processor 310 is configured to determine downlink channel information according to a CSI-RS on the CSI-RS resource, determine the downlink channel information as uplink channel information and determine the transmit beam and/or the precoding matrix for the transmission of the first uplink data according to the uplink channel information.

Optionally, as an implementation, the processor 310 is configured to determine a beam receiving or sending a reference signal in the at least one first reference signal resource as a beam for the transmission of the first uplink data.

Optionally, as an implementation, the at least one first reference signal resource is K SRS resources, K being equal to the number of the data transmission layers corresponding to the transmission of the first uplink data, and the processor 310 is configured to determine K transmit beams for sending SRS resources of the K SRS resources and determine the K transmit beams as transmit beams of the K data transmission layers, herein there are one to one correspondences between the K transmit beams and the K data transmission layers.

Optionally, as an implementation, the processor 310 is configured to determine a power control parameter corresponding to the at least one first reference signal resource as a sending power for the transmission of the first uplink data according to correspondences between reference signal resources and power control parameters.

Optionally, as an implementation, the processor 310 is configured to determine a power control parameter corresponding to the indication information of the first reference signal resource as a sending power for the transmission of the first uplink data according to correspondences between indication information of reference signal resources and power control parameters.

Optionally, as an implementation, the power control parameter includes at least one of an open loop power control parameter, a closed loop power control parameter or an estimated path loss value.

Optionally, as an implementation, the processor 310 is configured to determine a panel receiving or sending the reference signal in the at least one first reference signal resource as the panel for the transmission of the first uplink data.

Optionally, as an implementation, the at least one first reference signal resource is an SRS resource or a CSI-RS resource.

Optionally, as an implementation, the transceiver 320 is configured to receive second DCI sent by the network device at the same time of receiving the first DCI.

Optionally, as an implementation, the second DCI includes indication information of a second reference signal resource set, and the processor 310 is specifically configured to determine the second reference signal resource set according to the indication information of the second reference signal resource set, the second reference signal resource set being different from the first reference signal resource set.

Optionally, as an implementation, DMRS ports for the transmission of the first uplink data scheduled by the first DCI are different from DMRS ports for transmission of second uplink data scheduled by the second DCI.

It is to be understood that the terminal device 300 in the embodiment of the disclosure may correspond to the terminal device 200 in the embodiment of the disclosure and may correspond to a corresponding body executing the method 100 according to the embodiment of the disclosure and the abovementioned and other operations and/or functions of each unit in the terminal device 300 are adopted to implement the corresponding flows of the terminal device in each method in FIG. 1 respectively and will not be elaborated herein for simplicity.

In such a manner, the terminal device of the embodiment of the disclosure receives multiple DCIs sent by the network device, different DCI being used to schedule uplink transmission on different panels, and determines uplink channel information of the corresponding panels according to different resource sets indicated in different DCI, and then independent transmission parameters may be adopted for data transmission of multiple panels, so that the multi-panel transmission flexibility and the uplink spectrum efficiency may be improved.

It is to be noted that the method implementations of the disclosure may be applied to a processor or implemented by the processor. The processor may be an integrated circuit chip with a signal processing capability. In an implementation process, each step of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the implementations of the disclosure may be implemented or executed. The universal processor may be a microprocessor or the processor may also be any conventional processor and the like. The steps of the method disclosed in combination with the implementations of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm steps of each example described in combination with the implementations disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some implementations provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the implementations according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The storage medium includes: various media capable of storing program codes such as a U disk, a mobile hard disk, a ROM, a RAM, a magnetic disk or an optical disk.

The above is only the specific implementations of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for uplink data transmission, performed by a terminal device, comprising:
    receiving first Downlink Control Information (DCI) used to schedule transmission of first uplink data from a network device, the first DCI comprising indication information of a first reference signal resource set and indication information of first reference signal resource;
    determining the first reference signal resource set according to the indication information of the first reference signal resource set, the first reference signal resource set comprising at least one reference signal resource;
    determining at least one first reference signal resource in the first reference signal resource set according to the indication information of the first reference signal resource; and
    determining a transmission parameter for the transmission of the first uplink data according to the at least one first reference signal resource;
    wherein the method further comprises:
    receiving first configuration information from the network device, the first configuration information being used to indicate a plurality of reference signal resource sets, wherein
    determining the first reference signal resource set according to the indication information of the first reference signal resource set comprises:
        determining the first reference signal resource set from the plurality of reference signal resource sets according to the indication information of the first reference signal resource set;
    wherein there are one to one correspondences between the plurality of reference signal resource sets and a plurality of Phase Tracking Reference Signal (PTRS) ports;
    wherein the method further comprises:
    determining a first PTRS port corresponding to the first reference signal resource set according to the correspondences between the plurality of reference signal resource sets and the plurality of PTRS ports; and
    transmitting an uplink PTRS on a physical resource for the transmission of the first uplink data via the first PTRS port.

2. The method of claim 1, wherein the plurality of reference signal resource sets are used for transmission of reference signal on a plurality of panels.

3. The method according to claim 1, further comprising:
    determining a first Physical Uplink Shared Channel (PUSCH) power control parameter set corresponding to the first reference signal resource set according to correspondences between the plurality of reference signal resource sets and a plurality of PUSCH power control parameter sets.

4. The method of claim 3, further comprising:
    determining, according to the indication information of the first reference signal resource, a power control parameter for PUSCH transmission scheduled by the first DCI, from the first PUSCH power control parameter set.

5. The method of claim 1, wherein the transmission parameter for the transmission of the first uplink data comprises at least one of: a precoding matrix, a number of transmission layers, a number of antenna ports, a transmit beam, a power control parameter or a panel.

6. The method of claim 1, further comprising:
    receiving second DCI from the network device at the same time of receiving the first DCI.

7. The method of claim 6, wherein the second DCI comprises indication information of a second reference signal resource set; and
    the method further comprises:
        determining the second reference signal resource set according to the indication information of the second reference signal resource set, the second reference signal resource set being different from the first reference signal resource set.

8. A terminal device, comprising:
    a transceiver, configured to receive first Downlink Control Information (DCI) used to schedule transmission of first uplink data from a network device, the first DCI comprising indication information of a first reference signal resource set and indication information of first reference signal resource; and a processor, configured to determine the first reference signal resource set according to the indication information of the first reference signal resource set, the first reference signal resource set comprising at least one reference signal resource, wherein the processor is further configured to:
  determine at least one first reference signal resource in the first reference signal resource set according to the indication information of the first reference signal resource; and
  determine a transmission parameter for the transmission of the first uplink data according to the at least one first reference signal resource;

wherein the transceiver is further configured to:
receive first configuration information from the network device, the first configuration information being used to indicate a plurality of reference signal resource sets; and the processor is specifically configured to:
  determine the first reference signal resource set from the plurality of reference signal resource sets according to the indication information of the first reference signal resource set;

wherein there are one to one correspondences between the plurality of reference signal resource sets and a plurality of Phase Tracking Reference Signal (PTRS) ports;

wherein the processor is further configured to:
  determine a first PTRS port corresponding to the first reference signal resource set according to the correspondences between the plurality of reference signal resource sets and the plurality of PTRS ports; and
  transmit an uplink PTRS on a physical resource for the transmission of the first uplink data via the first PTRS port.

9. The terminal device of claim 8, wherein the plurality of reference signal resource sets are used for transmission of reference signal on a plurality of panels.

10. The terminal device of claim 8, wherein the processor is further configured to:
  determine a first Physical Uplink Shared Channel (PUSCH) power control parameter set corresponding to the first reference signal resource set according to correspondences between the plurality of reference signal resource sets and a plurality of PUSCH power control parameter sets.

11. The terminal device of claim 10, wherein the processor is further configured to:
  determine, according to the indication information of the first reference signal resource, a power control parameter for PUSCH transmission scheduled by the first DCI, from the first PUSCH power control parameter set.

12. The terminal device of claim 8, wherein the transmission parameter for the transmission of the first uplink data comprises at least one of: a precoding matrix, a number of transmission layers, a number of antenna ports, a transmit beam, a power control parameter or a panel.

13. The terminal device of claim 8, wherein the transceiver is further configured to:
  receive second DCI from the network device at the same time of receiving the first DCI; and
  the second DCI comprises indication information of second reference signal resource set; and the processor is specifically configured to:
    determine a second reference signal resource set according to the indication information of the second reference signal resource set, the second reference signal resource set being different from the first reference signal resource set.

14. A non-transitory computer storage medium having stored therein computer-executable instructions that when executed by a processor, perform a method for uplink data transmission, the method comprising:
  receiving first Downlink Control Information (DCI) used to schedule transmission of first uplink data from a network device, the first DCI comprising indication information of a first reference signal resource set and indication information of first reference signal resource;
  determining the first reference signal resource set according to the indication information of the first reference signal resource set, the first reference signal resource set comprising at least one reference signal resource;
  determining at least one first reference signal resource in the first reference signal resource set according to the indication information of the first reference signal resource; and
  determining a transmission parameter for the transmission of the first uplink data according to the at least one first reference signal resource;

wherein the method further comprises:
  receiving first configuration information from the network device, the first configuration information being used to indicate a plurality of reference signal resource sets, wherein
  determining the first reference signal resource set according to the indication information of the first reference signal resource set comprises:
    determining the first reference signal resource set from the plurality of reference signal resource sets according to the indication information of the first reference signal resource set;

wherein there are one to one correspondences between the plurality of reference signal resource sets and a plurality of Phase Tracking Reference Signal (PTRS) ports;

wherein the method further comprises:
  determining a first PTRS port corresponding to the first reference signal resource set according to the correspondences between the plurality of reference signal resource sets and the plurality of PTRS ports; and
  transmitting an uplink PTRS on a physical resource for the transmission of the first uplink data via the first PTRS port.

* * * * *